May 26, 1931. L. M. PERSONS 1,807,226
DRAFT CONTROLLER
Filed Oct. 24, 1928 3 Sheets-Sheet 1
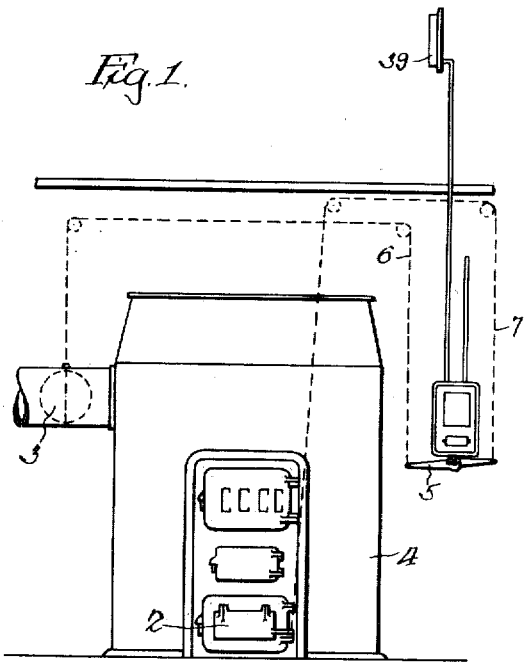
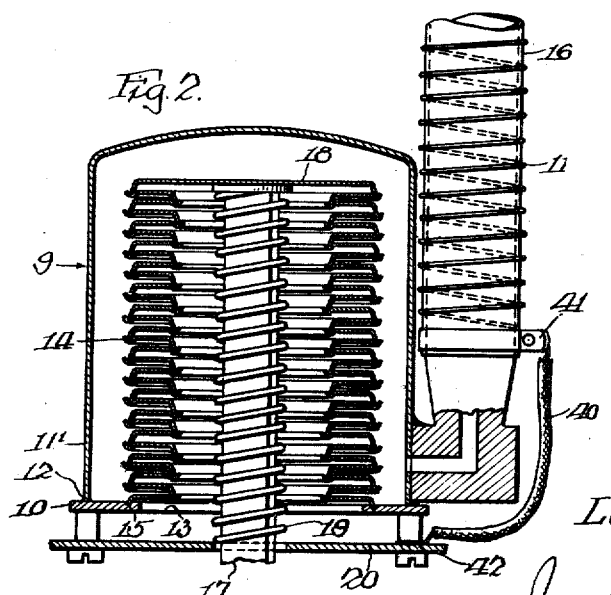
Inventor:
Lawrence M. Persons

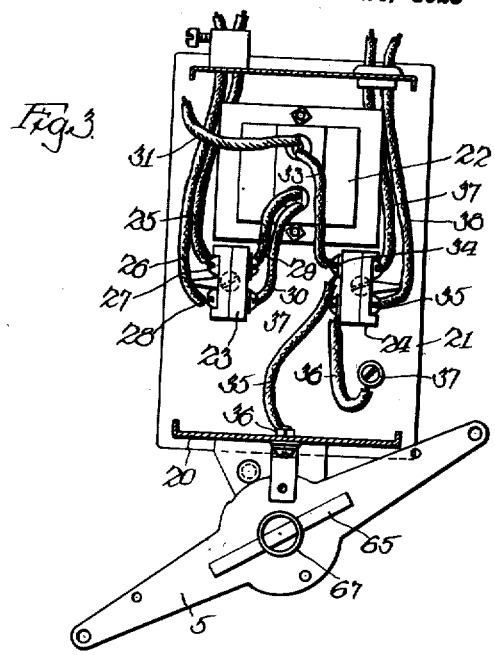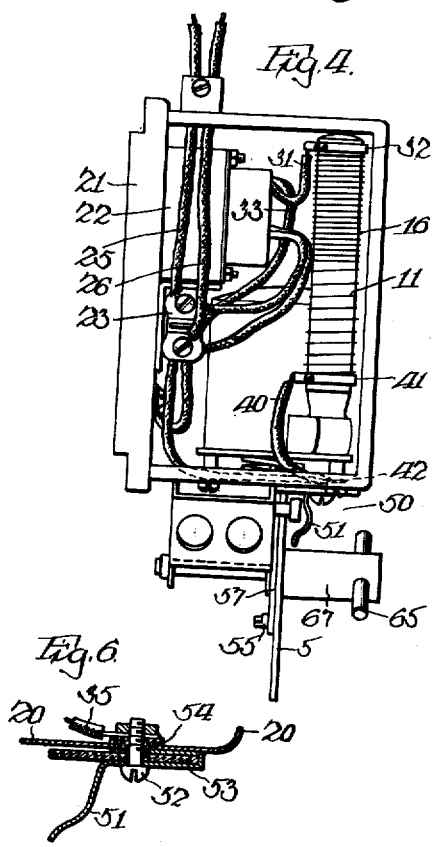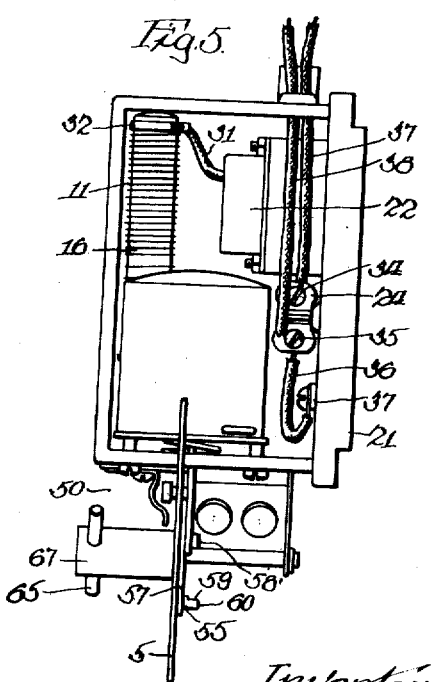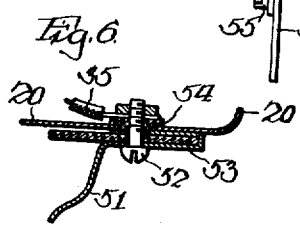

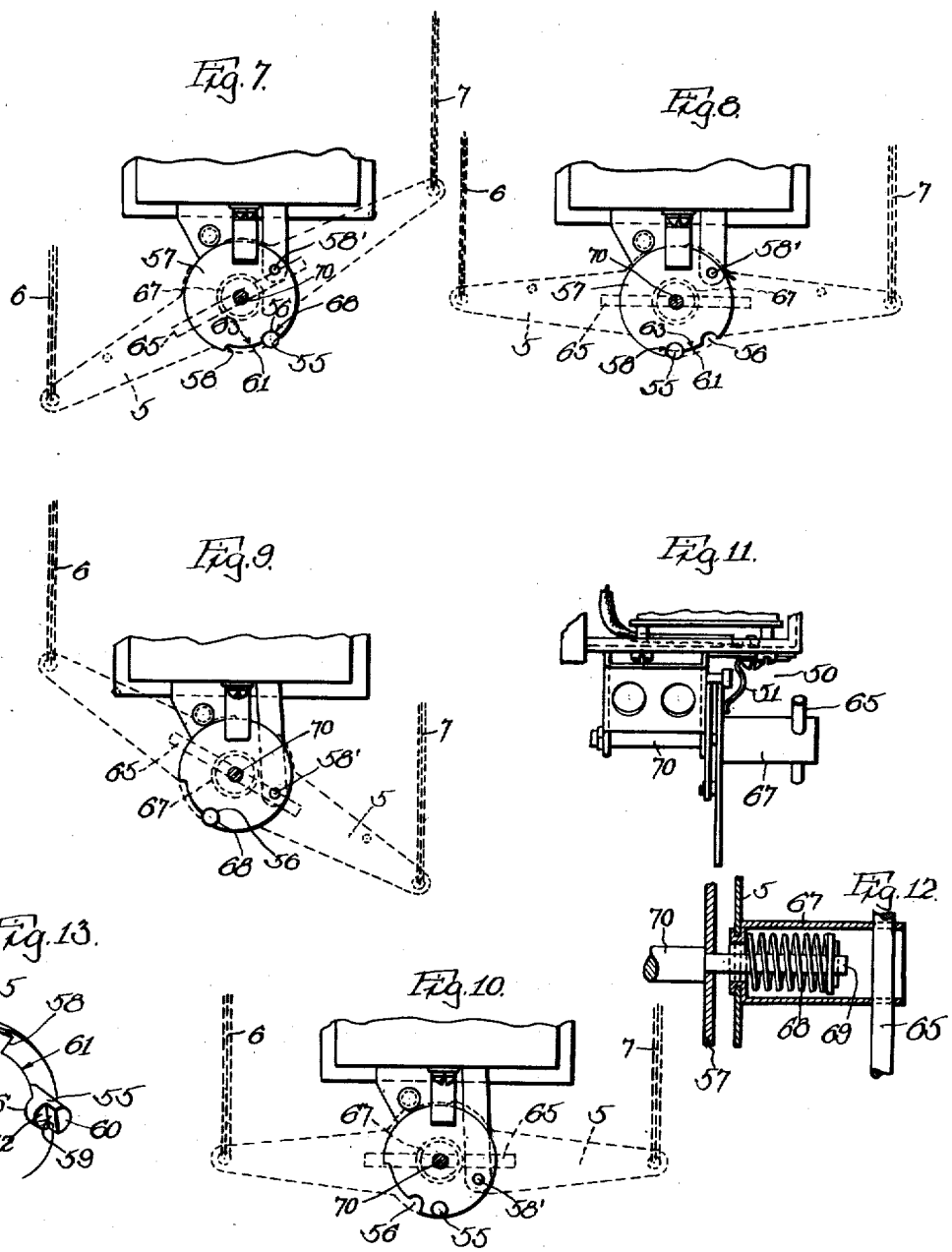

Patented May 26, 1931

1,807,226

UNITED STATES PATENT OFFICE

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS

DRAFT CONTROLLER

Application filed October 24, 1928. Serial No. 314,636.

My invention relates to a novel form of draft controller which may be electrically controlled by a thermostat to operate the air inlet damper and check damper of a heater.

It has been found desirable to operate the draft controller at the furnace independently of the room thermostat in order to permit the attendant to fire the boiler in the basement without gaining access to the upper floors of the building. Usually both dampers should be closed during firing and the controller set thereafter to open the air inlet damper and to hold the check damper closed. If the room thermostat is closed, however, at this time and the attendant should inadvertently attempt to set the controller so as to close both dampers, a condition might be created where the automatic operation of the controller is destroyed and the controller remains actuated. Closing the room thermostat keeps the thermal element actuated and the damper lever in a position to hold the air inlet damper open. Obviously any attempt at this time to close the heating circuit in the basement merely short circuits the room thermostat so that the heating circuit fails to open when the room thermostat opens upon raising of the room temperature, and accordingly the thermal element permanently is held actuated.

An object of the invention is to provide an improved form of switch that may be operated by the attendant in the basement at the time of firing to close the circuit of the thermal element in the event the thermostat is open and at the same time to close the dampers.

A further object of the invention is to provide means associated with said switch to prevent the thermostat from being short circuited by rendering the switch inoperative while the thermostat is closed, this being accomplished by preventing the operation of the switch when the damper lever is in position holding the air inlet damper open and the check damper closed. There is no possibility, therefore, of the heating circuit of the thermal element being permanently closed to destroy the automatic operation of the controller.

Other objects and advantages of my invention will be apparent from the detailed description taken in connection with the accompanying drawings, in which:

Figure 1 is a view illustrating the front portion of a furnace or heater with the structure embodying my invention applied thereto;

Fig. 2 is an enlarged vertical sectional view of the thermal element;

Fig. 3 is a view of the rear wall of the controller illustrating certain circuit connections;

Fig. 4 is an elevation of one side of the controller;

Fig. 5 is a similar view of the opposite side of the controller;

Fig. 6 is a detail sectional view illustrating the stationary contact of the short-circuiting switch connected in one side of the heating circuit.

Fig. 7 is a detail view illustrating the position of the damper lever in dotted lines when the air inlet damper is closed and the check damper is opened.

Fig. 8 is a view illustrating the damper lever disengaged from the controller and set in an intermediate horizontal position to close the air inlet damper and the check damper and with the short circuiting switch closed;

Fig. 9 illustrates the check lever thereafter engaged and moved by the thermal element to a position holding the air inlet damper open and the check damper closed and with the short circuiting switch again open;

Fig. 10 is a view illustrating the manner in which the heating circuit might be permanently closed to allow the thermal element to remain permanently actuated and thereby hold the dampers in a closed or firing position for the furnace if means were not provided to prevent operation of the clutch and switch when the room thermostat is closed;

Fig. 11 is a side elevational view of the mechanism in the position shown in Fig. 8;

Fig. 12 is a detail sectional view of a portion thereof; and

Fig. 13 is a detail view of the means herein employed to prevent operation of the clutch and switch when the room thermostat is closed.

My invention, as embodied in the structure shown in the drawings, comprises an electric draft controller which may be applied to various types of heaters or furnaces having the usual air inlet damper 2 and the check damper 3. In the drawings, I have illustrated a portion of the furnace, being designated 4, but it will be understood that in so far as the disclosure of my invention is concerned, this illustration is merely conventional inasmuch as the invention is capable of wide application in this field. The electric draft controller is provided with a damper lever 5, mounted preferably in pivotal relation at the bottom of the controller, and having its ends perforated to permit attachment of suitable connections to the dampers. The left-hand end of damper lever 5 may be connected to check damper 3 by a chain or like flexible connection 6, while the right-hand end of damper lever 5 may be connected to air inlet damper 2 by a chain or like flexible connection 7. The arrangement permits both dampers to be in closed position when damper lever 5 is in horizontal position, as illustrated in Figure 1. Movement of the damper lever clockwise raises the left-hand end to close check damper 3 and to open air inlet damper 2. Counterclockwise movement of damper lever 5 to the extreme opposite position closes air inlet damper 2 and opens check damper 3.

Any suitable actuating mechanism may be provided in the draft controller for operating damper lever 5. A thermally operated element 9 of the expansible and contractible type is preferably employed, however, having a heat coil 11 suitably wound about a tube 16 carried adjacent to the thermal element 9. This element may comprise a base 10 to which is attached an inverted housing 11' hermetically sealed at 12. The base is preferably perforated at 13 and an expansible and contractible wall or bellows 14 is mounted within housing 9. Bellows 14 is also hermetically sealed to base plate 10 at 15. Tube 16 may be carried by housing 11' at one side whereby the interior of the tube may communicate with the closed chamber provided between housing 11' and bellows 14. An actuating arm 17 extends through base 10 and into the interior of bellows 14 to connect to a top plate 18 of the bellows. A coil spring 19 surrounds actuating arm 17 between top plate 18 and base 20 of the housing of the controller.

This housing includes a vertical wall plate 21 (Fig. 3) carrying any suitable form of transformer 22 and the terminal blocks 23 and 24. Terminal block 23 is adapted to receive line wires 25 and 26 at terminals 27 and 28, respectively, which wires are continued at 29 and 30 to transformer 22. Wire 31 leading from the secondary coil of transformer 22 may connect to a terminal band 32 surrounding and suitably attached at the upper end of tube 16. As illustrated in Fig. 4, heat coil 11 will be attached at its upper end to terminal band 32. Wire 33 of the opposite side of the secondary coil of transformer 22 connects to a terminal 34 of terminal block 24. Wires 37 and 38 connect a room thermostat 39 in circuit with heat coil 11. Wire 37 connects to terminal 34 on the opposite side of terminal block 24, and leads to thermostat 39. This thermostatic circuit is completed by wire 38 on the opposite side by connecting to terminal 35 of terminal block 24 and then to a grounded connection by wire 36 connecting at 37' to wall plate 21. The heating circuit is completed by wire 40 grounding the lower terminal band 41 on heating tube 16 to base 20 at 42 (Figs. 2 and 4).

The closed chamber defined by housing 11' and bellows 14, as well as the interior of tube 16, is adapted to contain a volatile fluid, which, when heated, will expand and collapse the bellows. Such collapsing movement of bellows 14 operates the damper lever 5 clockwise, through the actuating arm 17, whereby to open air inlet damper 2 and to close check damper 3. This action occurs when the heating circuit is closed by the closing of room thermostat 39 upon lowering of the temperature in the room. The heating circuit may be traced as follows: The current will flow through wire 38 to terminal 35, wire 36, to grounded connection 37', through wire 40 grounded at 42, terminal band 41, heat coil 11, wire 31, the secondary coil of transformer 22, through wire 33, wire 37 and thermostat 39. Current flowing through heat coil 11 develops heat at tube 16 to vaporize and to drive the volatile substance into the closed chamber of the thermal element 9 whereby to depress bellows 14 and move actuating arm 17 downwardly. This movement of actuating arm 17 rotates damper lever 5 in a clockwise direction (shown in Fig. 9) to open the air inlet damper 2 and close the check damper 3. Air supplied to the heater 4 by the air inlet damper 2 supports combustion within the heater whereby the room temperature will be raised and the thermostat 39 opened. Tube 16 then cools and the vapor condenses to allow the volatile fluid to return into tube 16. Bellows 14 will return to normal position and the upward movement of actuating arm 17 will rotate damper lever 5 counterclockwise (see Fig. 7) whereby the air inlet damper 2 is closed and the check damper 3 is opened.

During the firing of the boiler, it is desirable, as above mentioned, to close both dampers without disconnecting the damper lever 5, which would destroy the automatic operation of the controller if not reconnected. To prevent this possibility, I provide a novel form of clutch mechanism between damper lever 5 and the controller whereby when it is desirable to bring both dampers closed, the damper lever may be disengaged and moved to a horizontal position. An improved form of switch for automatically closing the heat circuit at the controller when the damper lever is disengaged and moved to a horizontal position and the dampers are closed, is also provided so that after the firing is completed, the thermal element 9 may operate automatically to actuate the dampers —to move the air inlet damper to open position for supplying fresh air and supporting increased combustion and to move the check damper to closed position.

Another feature of the invention, which will later be described, comprises means associated with the damper lever 5 and clutch mechanism preventing disengagement of the damper lever when room thermostat 39 is closed, in order to prevent a condition where the automatic operation of the controller might be destroyed by permanently closing the heating circuit of thermal element 9.

Switch 50 comprises a fixed contact 51 suitably carried in insulated relation on the bottom of base 20 by means of a terminal screw 52. By referring particularly to Fig. 6, it will be observed that fixed terminal 51 is held against the underside of base 20, but in insulated relation by a plate of insulation 53, by means of terminal screw 52, the latter being insulated from base 20 by an insulated washer 54. Wire 35 connected at its upper end to terminal block 24 is secured to terminal screw 52.

When damper lever 5 is disengaged from the controller and moved to a horizontal position as illustrated in Fig. 8, it is first pulled forwardly to disengage a pin 55 from the semi-circular groove 56, cut in the lower edge of a disc 57, to which actuating arm 17 of thermal element 9 is connected, by means of a stud 58 fixed in disc 57 and engaged by arm 17. Clockwise rotation of damper lever 5 to a horizontal position moves pin 55 to the right until it strikes against the shoulder 58. The lower half of pin 55 is cut away at 59 for a limited distance as illustrated in Fig. 13, to provide a projection 60. Disc 57 is provided with a groove 61 co-extensive with the semi-circular groove 56. The opposite end of groove 61 terminates in shoulder 58. The cutting away at 59 of pin 55 provides a face 62 which, when pin 55 is moved out of semi-circular groove 56, rides against the surface 63 of disc 57. This holds the damper lever in an outward position, while projection 60 keeps the pin within groove 61. When pin 55 is moved clockwise to bring the damper lever to a horizontal position, projection 60 thereof abuts against shoulder 58. This projection 60 extends beyond groove 61 so as to lock, as just mentioned, the pin 55 within groove 61.

A handle 65 is carried by damper lever 5 and may be engaged to pull the damper lever outwardly in the manner above described. This damper lever is adapted to carry a sleeve 67, which has handle 65 extending therethrough near the outer end. Within sleeve 67 a spring 68 is provided, which spring bears at one end against a plate 69 carried on a fixed shaft 70 and against the inner end of the sleeve. As the damper lever is moved outwardly, spring 68 is compressed and placed under tension. The purpose of this feature is to allow damper lever 5 to snap back into normal position as soon as disc 57 is rotated clockwise to bring semi-circular groove 56 into alignment with pin 55.

As damper lever 5 is moved outwardly, it engages at a central portion stationary contact 51. The heating circuit is thereby closed inasmuch as one side of the circuit is grounded to the frame of the controller at the point 42. Current will flow through wire 35, stationary contact 51, the frame of the controller, through wire 40 leading and connecting to heat coil 11, through this heat coil, and then through wire 31 to the transformer. By referring to Fig. 3, it will be observed that the wire 35 connects stationary contact 51 in parallel with room thermostat 39 so that this room thermostat is short-circuited when the circuit is closed at contact 51.

Closing switch 50 at contact 51 develops heat by the current flow at heat coil 11 to actuate thermal element 9. Such actuation causes disc 57 to rotate clockwise, and thereby allow (if damper lever 5 has been disengaged as shown in Fig. 8) the semi-circular groove 56 to register with pin 55, whereupon face 62 holding the damper lever disengaged will be released from the edge 63 to permit spring 68 to move damper lever 5 inwardly. Continued movement of the thermal element, and consequently disc 57 in a clockwise direction, will swing damper lever 5 to a position shown in Fig. 9, namely, a position where the air inlet damper 2 is opened and the check damper 3 is closed.

In the event the attendant desires to fire the furnace while the room thermostat 39 is closed and the damper lever 5 is in the position shown in Fig. 9, it is undesirable to close switch 50. With the thermostat 39 and the heating circuit of the thermal element 9 closed, the bellows 14 is compressed to full extent and the disc 57 is rotated clockwise its maximum distance. Closing switch 50 at this time in the cycle of operation of the controller will permanently close the heating circuit of thermal element 9 and destroy the automatic operation of the controller; namely, prevent the controller from swinging the damper lever counterclockwise to a position illustrated in Fig. 7 and closing the air inlet damper 2 and opening the check damper 3 when the room thermostat 39 again opens. It will be observed in Fig. 9 that under these conditions the pin 55 lies in groove 56. If the attendant attempts to rotate the damper lever 5 counterclockwise to a horizontal position at this time after the lever is pulled outwardly, projection 60 will abut against shoulder 68 and lock this damper lever against movement.

In Fig. 10 I have illustrated the manner in which the heating circuit would be permanently closed and the automatic operation of the controller destroyed if switch 50 is permitted to close while room thermostat 39 is closed. It is assumed, of course, in illustrating this condition by means of Fig. 10 that projection 60 is omitted from pin 55. The damper lever is moved outwardly and then rotated counterclockwise to a horizontal position. The pin 55 is thereby moved to the left of semi-circular groove 56, while the thermal element 9 is actuated. The room thermostat 39 is thereby short-circuited and the heating circuit remains closed. The bellows 14 remains depressed and consequently the controller is locked in actuated position. If the attendant should accidentally disengage the damper lever 5 and move it to a horizontal position as shown in Fig. 10, thereby short-circuiting the room thermostat 39 while it is closed, he will destroy the automatic operation of the controller and leave the furnace in a firing condition, namely, with both dampers closed. This is a very undesirable condition and of course would be impractical in actual use. Accordingly, the projection 60 is provided which positively prevents the damper lever from being moved to a horizontal position when the damper lever is in the position as shown in Fig. 9, namely, when the air inlet damper is open and the check damper is closed, with the room thermostat 39 also closed.

Briefly stated, the projection 60 constitutes means for preventing the short-circuiting of the room thermostat 39 while the latter is closed,—in order to move the damper lever 5 to a horizontal position and to close both dampers during the firing of the furnace.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. The combination with a heater, of an electrically operated controller therefor comprising an expansible and contractible fluid containing member, means actuated thereby and controlling the combustion in said heater, an electric heater acting on the fluid in said member, a thermostat for controlling said electric heater, means for short-circuiting said thermostat to permit said electric heater to act on said fluid in said heater independently of said thermostat, and means preventing the operation of said short-circuiting means while said thermostat is closed.

2. The combination with a heater, of an electrically operated controller therefor comprising an expansible and contractible fluid containing member, means actuated thereby and controlling the combustion in said heater, an electric heater acting on the fluid in said member, a thermostat for controlling said electric heater, a manually operated electric switch for short-circuiting said thermostat, and means preventing the operation of said short-circuiting means while said thermostat is closed.

3. The combination with a heater, of a controller therefor, means actuated thereby and controlling the combustion of said heater, means for setting said actuated means in a position for firing said heater, and means for preventing the operation of said setting means.

4. The combination with a heater, of a controller therefor, a lever actuated thereby and controlling the combustion in said heater, manually operable means for setting said lever in a position for firing said heater, and means cooperating with said lever to prevent the operation of said manually operable means.

5. An electrically operated controller comprising a heat motor, a thermostatically controlled electric heater for said heat motor, means connected in circuit with said electric heater for temporarily short-circuiting said thermostatic control, and means for preventing the operation of said short-circuiting means while said thermostatic control is actuated.

6. An electric draft controller comprising an expansible and contractible liquid containing member, an electric heater to vary the temperature of the liquid, a thermostat in circuit with said electric heater, a switch in circuit with said heater and mechanism in circuit with said heater and having a relatively fixed contact, a lever actuated by said liquid containing member, a relatively movable contact associated with said lever, spring means tending normally to prevent the engagement of said contacts, means for holding said contacts in engagement against the tension of said spring to short circuit said thermostat, and means disabling said short circuiting means while said thermostat is closed.

7. The combination with a heater having an air inlet damper and a check damper, of an electrically operated draft controller comprising an expansible and contractible liquid containing member, a lever actuated thereby and having one end connected to the air inlet damper and the other end connected to the check damper, an electric heater controlling the temperature of the liquid, a thermostat in circuit with said heater, a switch also in circuit with said heater, means for closing said switch and for moving said lever in a position to close said air inlet damper and said check damper, and means for preventing the closing of said switch and movement of said lever when said thermostat is closed.

8. In combination with a vapor motor having a heating coil to cause operation thereof, a rotary disc operated by the motor, an actuing member interlocking therewith, means for laterally displacing the actuating member to break the interlock between it and the disc, and a stop preventing lateral movement of the actuating member.

9. In combination with a vapor motor having a heating coil to cause operation thereof, a rotary disc operated by the motor, an actuating member interlocking therewith, means for laterally displacing the actuating member to break the interlock between it and the disc, a stop preventing lateral movement of the actuating member, a switch adapted to be closed when the actuating member is disengaged from the disc to close a heating circuit through the motor to cause rotation of the disc in the direction previously taken by the actuating member upon disconnection from the disc.

10. In combination with a vapor motor having a heating coil to cause operation thereof, a rotary disc operated by the motor, an actuating member interlocking therewith, means for laterally displacing the actuating member to break the interlock between it and the disc, a stop preventing lateral movement of the actuating member, a switch adapted to be closed when the actuating member is disengaged from the disc to close a heating circuit through the motor to cause rotation of the disc in the direction previously taken by the actuating member upon disconnection from the disc, yielding means to automatically return the actuating member and disc to interlocking position during the forward excursion of the motor.

11. In combination, a thermostat responsive to temperature variation, a motor, the operation of which is controlled by the thermostat, a furnace, dampers controlling the furnace operation, an actuating member operated by the motor for controlling the dampers in response to the thermostat, means for temporarily disconnecting the motor and the damper actuating member to permit adjustment independent of the thermostat control, automatic means for connecting the motor and the actuating means, means independent of the thermostat for operating the motor during the time the motor and the actuating means are disconnected, and means preventing the operation of the independent operating means during a time the thermostat is closed.

12. In combination with a vapor motor having a heating coil to cause operation thereof, a rotary disc operated by the motor, an actuating member interlocking therewith, means for laterally displacing the actuating member to break the interlock between it and the disc, and means preventing the laterally displacing movement of the actuating member.

13. In combination, a thermostat responsive to temperature variation, a motor, the operation of which is controlled by the thermostat, a furnace, dampers controlling the furnace operation, an actuating member operated by the motor for controlling the dampers in response to the thermostat, means independent of the control of the thermostat for moving the dampers to a selected position, means independent of the thermostat for operating the motor during the time the control of the thermostat over the motor is discontinued, and means preventing the operation of the damper moving means in the event the thermostat is closed.

14. In combination, a thermostat responsive to temperature variation, a motor, the operation of which is controlled by the thermostat, a furnace, dampers controlling furnace operation, an actuating member operated by the motor for controlling the dampers in response to the thermostat, means for temporarily discontinuing the control of the thermostat over the dampers and automatically after a predetermined interval resuming such control including means independent of the thermostat for operating the motor during the time the control of the thermostat over the dampers is discontinued, and means rendering said independently operating means ineffective to operate the motor at a time the thermostat is closed.

15. In combination, an electrically operated motor, a circuit breaker in the motor circuit for controlling the operation of the motor, an actuating member operated by the motor in response to the closing operation of the circuit breaker, means independent of the control of the circuit breaker over said motor for moving the actuating member to a selected position, means independent of the operation of the circuit breaker for operating the motor during a time the control of the circuit breaker over said motor is discontinued, and means preventing the operation of the means moving the actuating member at a time the circuit breaker is closed.

16. A damper control lever mechanism in combination in an electrically operated damper controller, the lever mechanism being free for movement independent of said controller, means for causing the controller to resume control of said lever mechanism, and means holding said lever mechanism under the control of said controller and preventing independent movement when said controller is actuated.

17. A damper control lever mechanism in combination in an electrically operated damper controller having means for automatically moving the lever mechanism to a selected position and means for freeing the lever mechanism for movement independent of the controller, the combination of locking means preventing free movement of the lever mechanism during the time the lever mechanism is in said selected position.

In witness whereof, I have hereunto subscribed my name.
LAWRENCE M. PERSONS.

damper controller, the lever mechanism being free for movement independent of said controller, means for causing the controller to resume control of said lever mechanism, and means holding said lever mechanism under the control of said controller and preventing independent movement when said controller is actuated.

17. A damper control lever mechanism in combination in an electrically operated damper controller having means for automatically moving the lever mechanism to a selected position and means for freeing the lever mechanism for movement independent of the controller, the combination of locking means preventing free movement of the lever mechanism during the time the lever mechanism is in said selected position.

In witness whereof, I have hereunto subscribed my name.

LAWRENCE M. PERSONS.

CERTIFICATE OF CORRECTION.

Patent No. 1,807,226.    Granted May 26, 1931, to

LAWRENCE M. PERSONS.

It is hereby certified that error appears in the printed specification of the above numbered patent requiring correction as follows: Page 3, line 2, for the word "present" read prevent; and that the said Letters Patent should be read with this correction therein that the same may conform to the record of the case in the Patent Office.

Signed and sealed this 4th day of August, A. D. 1931.

Wm. A. Kinnan,
Acting Commissioner of Patents.

(Seal)

CERTIFICATE OF CORRECTION.

Patent No. 1,807,226. Granted May 26, 1931, to

LAWRENCE M. PERSONS.

It is hereby certified that error appears in the printed specification of the above numbered patent requiring correction as follows: Page 3, line 2, for the word "present" read prevent; and that the said Letters Patent should be read with this correction therein that the same may conform to the record of the case in the Patent Office.

Signed and sealed this 4th day of August, A. D. 1931.

(Seal)

Wm. A. Kinnan,
Acting Commissioner of Patents.